UNITED STATES PATENT OFFICE.

WILLIAM H. SHECUT AND HORACE H. DAY, OF NEW YORK, N. Y.

IMPROVEMENT IN ADHESIVE PLASTERS.

Specification forming part of Letters Patent No. 3,965, dated March 26, 1845.

*To all whom it may concern:*

Be it known that we, WILLIAM HARROL SHECUT and HORACE H. DAY, of the city and State of New York, U. S. A., have invented a new and improved mode of preparing adhesive and strengthening plasters of india-rubber and other materials for medicinal purposes, by which improvement the plasters are rendered porous or full of minute holes which allow the free escape of the perspiration and other morbid matter which may exude from the parts to which they may be applied, and which renders them infinitely superior to the plasters as commonly prepared for these purposes, the latter being stiff and hard and apt to crack, and when worn any length of time corrugate in wrinkles or folds which cause much uneasiness. They are also extremely difficult to remove, and being impervious to fluids retain the morbid matter discharged from the parts, so that unless they are removed frequently for the purpose of cleansing the surface the matter discharged is not only liable to be taken into the system again by absorption, but is otherwise disagreeable and offensive from its odor.

The articles we employ in the preparation of the said plasters are those known in commerce as caoutchouc or india-rubber-pine-gum obtained from the southern yellow pine, commonly termed "long-leafed pine," cayenne pepper, balsam of Peru, litharge, and spirits of turpentine.

To enable others skilled in the art to make and use our invention, we will proceed to describe our mode of preparing the composition and plaster.

We first cut five pounds of india-rubber into fine shreds and boil it an hour in common soft water to soften it. We then drain off the water and put the rubber into a tin or copper vessel which will hold at least sixty gallons, and pour into it a sufficient quantity of spirits of turpentine to cover the gum completely, adding from time to time more spirits of turpentine as the gum soaks it up. This process may be hastened by placing the vessel over a water-bath. When the rubber is sufficiently dissolved to admit of its being pressed through a fine wire seive it may be set aside for use. We next simmer four ounces of *Capsicum annuum* or cayenne pepper in a quart of spirits of turpentine about one hour and strain it with a portion of this tincture. We grind a pound of litharge on a slab or in a paint-mill, mix it with the remainder of the tincture of cayenne, and add to it six ounces of balsam of Peru. Then we melt a pound of pine-gum and add spirits of turpentine until it is thin enough to strain when nearly cool, and, lastly, mix the whole of the preceding preparations together until the mixture is of uniform color, without specks or lumps. It is then ready for spreading on any suitable material. Cotton cambric or muslin will answer the purpose extremely well.

For spreading we employ the machinery commonly used for preparing india-rubber cloth; but the common plaster-machine used by apothecaries may be used instead. After the composition is spread on the cloth it must be dried in the open air in summer, and in a stove-room in winter. Under the most favorable circumstances it will require eight or ten days to dry it, and then will still retain a slightly sticky feel or "tack," as it is termed, which unless the plasters are pierced singly would cause them to adhere strongly together. To prevent this we pounce or dust the cloth over with soap-stone reduced to an impalpable powder, and by this means four or five thicknesses of cloth may be perforated at one and the same time.

For punching the cloth it is necessary to use very small cutting-punches which cut out the hole completely, as the solid punches not only have the disadvantage of doing the work imperfectly, but likewise very soon spoil the wooden bed on which the cloths are laid to be perforated. The wooden bed should be made of transverse sections of hickory wood closely fitted together. By being cut across the fibers or grain of the wood the bed will last much longer and free the punches more effectually. The specimen sent was punched by hand; but as this would be an expensive mode of preparation we are making arrangements to perforate them by steam-power.

The plasters are finished by brushing them over with balsam of Peru and again drying them, when they are ready for use. The advantages which the plasters thus made possess over those in common use are they are always soft, adhesive, and porous—a combination of desirable qualities which no other plasters possess; and while they excite the discharge of acrid matter from the skin or ulcer, as the case may be, do not retain it, but allow its free passage through the plaster. They may also be removed at any time without difficulty—an advantage which will be readily appreciated by those who have used the adhesive and strengthening plasters as commonly prepared.

What we claim as our invention, and desire to secure by Letters Patent, is—

1. The combination of the materials in the general proportions above described for making an adhesive plaster.

2. Making plasters porous or pervious to fluids by perforating them with numerous minute holes.

WILLIAM H. SHECUT.
HORACE H. DAY.

Witnesses:
OWEN G. WARREN,
EDWIN G. WARREN.